Patented Aug. 30, 1932

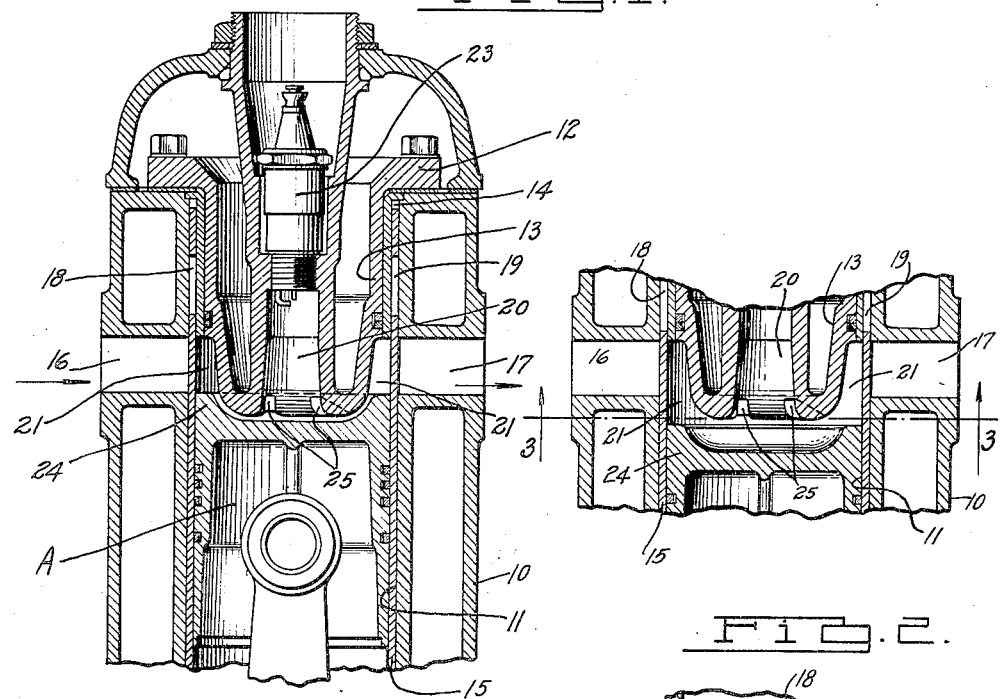
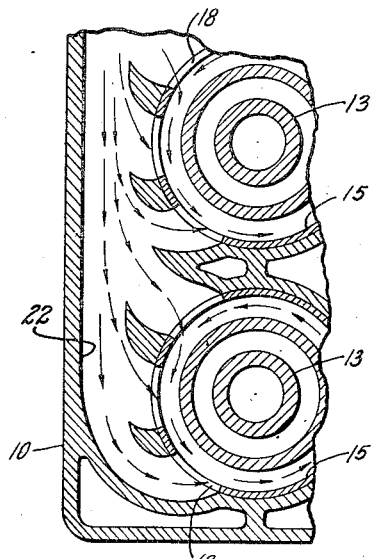
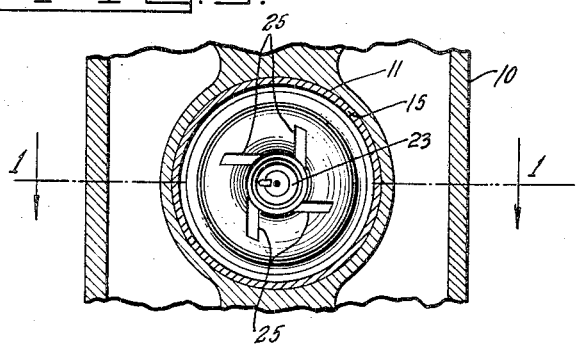
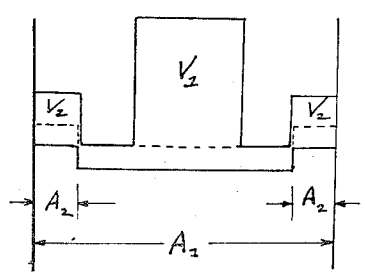
INVENTOR.
Andre J. Meyer
BY
ATTORNEY.

1,874,569

UNITED STATES PATENT OFFICE

ANDRE J. MEYER, OF DETROIT, MICHIGAN, ASSIGNOR TO CONTINENTAL MOTORS CORPORATION, OF DETROIT, MICHIGAN, A CORPORATION OF VIRGINIA

ENGINE AND METHOD OF PREPARING FUEL FOR COMBUSTION

Application filed November 20, 1930. Serial No. 496,910.

My invention relates to internal combustion engines and method of operation, and more particularly to the construction of a combustion space especially adapted for use with a sleeve valve engine and to an improved method of preparing the fuel mixture prior to combustion. Obviously the principles of my invention may be embodied in engines other than those of the sleeve valve type if desired.

Better engine efficiency and increased power output may be obtained with an engine having a relatively higher compression ratio, and it has been found that a relatively higher compression ratio can be obtained in engines in which the combustible fuel is caused to swirl. The reason for this, is that detonation under the above conditions occurs at relatively higher compression ratios than usual, because of the scrubbing action between the swirling fuel mixture and the relatively cool cylinder wall, which thereby effects an efficient dissipation of the compression heat in the last portion of the fuel charge to burn.

However, I have found that the central portion of the swirl is composed of a mixture of air and extremely fine particles of fuel, and further a large percentage of the fuel is vaporized, while that portion of the fuel mixture adjacent the outer limits of the swirl contains relatively heavier fuel particles and a smaller percentage of the fuel is vaporized, and the fuel mixture is not uniform. Because of the fact that the spark plug is usually located at or near the center of the combustion chamber and near the center of the swirl, the fuel at the center of the swirl will be the first to burn. Since the fuel at and near the center of the swirl is composed of vaporized fuel and more finely atomized fuel particles, it will burn much more rapidly than the last portion of the fuel charge to burn, thereby producing an objectionable roughness to the operation of the engine. The rate of pressure rise during combustion is controlled by the rate at which the fuel mixture burns, and rapid combustion of the fuel first to burn causes a relatively increased acceleration of the pressure rise at the beginning of the combustion stroke of the engine, which produces roughness in the operation of the engine. It will thus be noted that the compression ratio that can be obtained is limited to a certain extent by the roughness caused by the more rapid burning of the combustible fuel mixture at the center of the swirl.

It is the object of my invention to increase the engine efficiency and power output of an internal combustion engine by increasing the compression ratio without producing an objectionable roughness to the operation of the engine.

Another object of my invention is to increase the engine efficiency and power output of an internal combustion engine by providing a fuel mixture in the region of the spark plug of such a character that flame travel at the start of combustion will be relatively retarded in order to obtain a relatively high compression ratio without producing an objectionable roughness to the operation of the engine.

A further object of my invention in its more specific aspect is to eliminate roughness in the operation of an engine wherein a relatively high compression ratio is obtained by causing the combustible fuel to swirl, by mixing with the fuel first to burn a fuel mixture containing relatively heavier unvaporized fuel particles in order to retard the flame travel at the start of combustion.

A still further object of my invention is to increase the engine efficiency and power output of an internal combustion engine by controlling the rate of increase of the pressure rise during combustion through the agency of a means which upsets the swirling motion of the fuel mixture in the region of the spark plug.

For a more detailed understanding of my invention reference may be had to the accompanying drawing illustrating one form which my invention may assume and in which:

Figure 1 is a vertical transverse sectional view of an internal combustion engine constructed in accordance with my invention, showing the piston at approximately top dead center taken on the line 1—1 of Figure 3, Figure 2 is a fragmentary vertical transverse sectional view showing the piston positioned slightly below top dead center, Figure 3 is a bottom plan view of the cylinder head structure taken on the line 3—3 of Figure 2, Figure 4 is a horizontal section through a portion of the engine illustrating how the incoming fuel mixture is given an initial swirl, and Figure 5 is a diagrammatic view of the engine illustrating an embodiment of my invention in which a relative flow of fuel from one chamber to the other of the combustion space takes place.

I have chosen to show for purposes of illustration, an engine of the single sleeve valve type embodying the principles of my invention. As shown in the accompanying drawing the engine comprises a cylinder block 10 having a cylinder 11, and a cylinder head 12 secured to said cylinder block and provided with a depending portion 13 positioned in said cylinder and spaced from the wall of the cylinder to provide a sleeve pocket 14 adapted for receiving the upper portion of a single sleeve valve 15. The cylinder is provided with intake and exhaust ports 16 and 17 respectively, while the sleeve valve is provided with intake and exhaust ports 18 and 19. The sleeve valve may be actuated in any suitable manner and for purposes of illustration, I have shown a single sleeve, which is adapted for a combined reciprocating and oscillating movement with respect to the cylinder and sleeve axis.

The reentrant portion 13 of the cylinder head depending within the cylinder terminates in a peculiarly shaped surface which defines the upper side of the combustion chamber, this combustion chamber consisting of a central primary chamber 20 and an annular secondary chamber 21 which surrounds the said primary chamber.

The fuel taken into the cylinder from the manifold 22 is caused to swirl in the cylinder by reason of the manifold construction which is arranged to tangentially introduce the fuel into the cylinders substantially as illustrated in Figure 4. Due to the high velocity at which the fuel flows through the intake port, it is not unusual for the combustible fuel to swirl at a speed as great as 10 times crankshaft speed. As a result of this swirl, the heavier particles of the fuel are thrown outwardly by centrifugal force and there is a tendency to produce a vacuum at the center of the swirl, this vacuum tending to suck inwardly the fuel particles which are thrown to the outside. I find that the center portion of the swirl is thus composed of a combustible fuel mixture in which very fine fuel particles are held in suspension and in fact the mixture at the center of the swirl is substantially composed of completely vaporized fuel, while the outer portion of the swirl, adjacent the cylinder wall, is composed of a mixture containing relative heavier fuel particles and a smaller amount of vaporized fuel. This provides a fuel mixture in the combustion chamber that is not uniform, the fuel mixture at the center of the swirl being more inflammable than that at the outside of the swirl adjacent the cylinder wall. When the engine is fired by means of the sparking device or spark plug 23, carried by the cylinder head and located in proximity of the center of the swirl, the flame travel at the beginning of combustion will be quite rapid resulting in a rapid increase of pressure rise, and thereby causing an objectionable roughness to the operation of the engine.

In order to retard the flame travel at the start of combustion, I provide means for introducing a fuel mixture containing relatively heavier particles of fuel and a relatively smaller amount of vaporized fuel into the center of the swirl. I find it convenient to accomplish this by transposing at least a portion of the fuel mixture adjacent the cylinder wall into the central portion of the swirl.

As described above, I have stated that the combustion chamber is composed of a primary chamber 20 and a secondary chamber 21. This secondary chamber is annular and is arranged to surround the primary chamber, said secondary chamber being preferably located adjacent to the cylinder wall. The illustrated embodiment of my invention shows the piston A provided with an upwardly extending annular flange 24 that is adapted to project within the secondary combustion chamber when the piston is at top dead center as shown in Figure 1. It will be noticed that the annular flange 24 thereby displaces a portion of the fuel mixture in the secondary combustion chamber and this displaced fuel mixture must necessarily be forced out of the secondary chamber, and the only place in which it can go is into the primary combustion chamber. I have shown a portion of this fuel mixture in the secondary chamber displaced by the annular flange 24 carried by the piston, but obviously more or less of the fuel could be displaced if desired by increasing or decreasing the height or width of the annular flange 24, the amount of fuel that is necessary to be transformed being determined by the design and construction of the combustion chamber.

If desired, some of the combustible fuel which is transposed from the outer portion of the swirl to the central portion thereof may be given a directional force counter to the direction of rotation of the swirl in the primary combustion chamber. One means by which this may be accomplished is to provide the slots 25 in the cylinder head which are positioned in such a way as to inject at least some of the transposed fuel tangentially into the primary chamber in a direction substantially opposite to the rotation of the swirling fuel therein. Thus the swirl within the primary combustion chamber may, if desired, be upset by injection of this heavier fuel therein, in a direction opposite to the direction of rotation of the swirl, thereby retarding the flame travel.

By retarding the burning of the fuel mixture at the center of the swirl the tendency toward roughness in the operation of the engine is minimized and thus I have removed one of the limiting factors which determine the maximum compression ratio which may be obtained in an engine of this character, and consequently my engine may be constructed with a relatively higher compression ratio than has heretofore been possible.

In Figure 5 I have diagrammatically illustrated my principle of operation which causes at least a portion of the fuel mixture to be transposed from the outer secondary chamber to the inner primary chamber of the combustion space. This diagrammatic view shows a primary and secondary chamber of substantially rectangular shape for the purpose of illustrating the principle of my invention, but in actual practice the corners are rounded and the construction more nearly approximates that shown in Figures 1 and 2. The volume of the primary combustion chamber is designated $V_1$, while the volume of the secondary chamber is designated $V_2$. The total area of the piston top is designated $A_1$, while the area under the substantially annular secondary combustion chamber is designated $A_2$. As the piston is moved upwardly, the fuel mixture in said combustion chamber is compressed, the construction of the chambers being such that the pressure in the secondary chamber tends to increase more rapidly than the pressure in the primary chamber. These pressures tend to balance and the equalization of pressures is made possible by some of the fuel mixture in the secondary chamber flowing into the primary chamber. I find that the direction of movement of the fuel mixture is dependent upon the size and construction of the chambers. The relation between the volume of the combustion chambers and the area of the piston top corresponding to the respective chambers controls the movement of the fuel mixture, and this may be stated or expressed in the following manner:

$$\frac{V_1}{V_2} \text{ is greater than } \frac{A_1 - A_2}{A_2}$$

When the above conditions are met, the fuel mixture is caused to flow in the desired direction.

It may be observed that I locally change the density of the fuel mixture in the combustion chamber, and more specifically I change the density of the fuel mixture in the region of the spark plug by a fuel mixture means, i. e., I introduce a relatively dense fuel mixture in the zone at the spark plug while still maintaining the swirl. The use of the slots 25 upset the swirl only in the region of the spark plug, thereby maintaining the swirl in the zone remote from the spark plug. When the slots 25 are not used, the fuel mixture continues to swirl in the region of the spark plug.

Although I have illustrated but one form of my invention and have described in detail but a single application thereof, it will be apparent to those skilled in the art to which my invention pertains that various modifications and changes may be made therein without departing from the spirit of my invention or from the scope of the appended claims.

What I claim as my invention is:

1. In an internal combustion engine, a cylinder, a piston, a combustion chamber, means for introducing fuel mixture into said cylinder and imparting a swirling motion thereto, and means responsive to outward piston movement for introducing a portion of the fuel mixture formed of relatively heavy particles of unvaporized fuel into the center of said swirl.

2. In an internal combustion engine, a cylinder, a piston, a combustion chamber, means for introducing fuel mixture into said cylinder and imparting a swirling motion thereto, and means responsive to outward piston movement for transporting at least a portion of the fuel mixture adjacent the periphery of the swirl into the center of the swirl.

3. In an internal combustion engine, a cylinder, a piston, a combustion chamber, means for introducing fuel mixture into said cylinder and imparting a swirling motion thereto, means responsive to outward piston movement for transposing at least a portion of the fuel adjacent the periphery of the swirl into the center of the swirl, and simultaneously imparting to said transposed fuel a directional force counter to the direction of rotation of said swirl.

4. In an internal combustion engine, a cylinder, a piston, a combustion chamber, means for introducing fuel mixture into said cylinder and imparting a swirling motion thereto, and means responsive to outward piston movement for introducing a portion of the fuel mixture formed of relatively heavy particles of unvaporized fuel into the center of the swirl prior to the ignition of said fuel mixture.

5. In an internal combustion engine, a cylinder, a piston, a combustion chamber, means for introducing fuel mixture into said cylinder and imparting a swirling motion thereto, and means responsive to outward piston movement for introducing a portion of the fuel mixture formed of relatively heavy particles of unvaporized fuel into the center of the swirl, during the latter part of the outward compression stroke of the engine.

6. In an internal combustion engine, a cylinder, a piston, a combustion chamber, means for introducing fuel mixture into said cylinder and imparting a swirling motion thereto, a sparking device located in proximity to the center of the swirl, and means responsive to outward compressing piston movement for introducing a portion of the fuel mixture formed of relatively heavy particles of unvaporized fuel into the center of the swirl.

7. In an internal combustion engine, a cylinder, a piston, a combustion chamber, means for introducing fuel mixture into said cylinder and imparting a swirling motion thereto, said piston being provided with means acting on the fuel adjacent the periphery of the swirl for transposing at least a portion of the fuel adjacent the periphery of the swirl into the center of the swirl during the compressing stroke of the piston.

8. In an internal combustion engine having a cylinder and a combustion space divided into a pair of separated intercommunicating primary and secondary chambers, a piston operating in said cylinder, means for introducing a fuel mixture into said cylinder and imparting a swirling motion thereto, the ratio of the volume of the primary chamber to the volume of the secondary chamber being greater than the ratio of the total area of the piston top less the area under the secondary chamber to the area of the piston top under the secondary chamber, to thereby effect a relative flow of the fuel mixture from the secondary to the primary chamber during the compression stroke of the engine, and a spark plug associated with said primary chamber for initially igniting the fuel mixture in said primary chamber.

9. In an internal combustion engine, a cylinder, a combustion chamber, means for introducing a combustible fuel into said cylinder and imparting a swirling motion thereto, and a piston operating in said cylinder and provided with an annular flange adapted to project into that part of the combustion chamber adjacent the cylinder wall when the piston is at top dead center to displace a portion of the fuel in the combustion chamber and to transpose the displaced fuel into the center of the swirl.

10. In an internal combustion engine, a cylinder, a cylinder head provided with a combustion chamber consisting of a primary chamber and a secondary chamber surrounding the primary chamber and located adjacent the cylinder wall, means for introducing a combustible fuel into said cylinder and imparting a swirling motion thereto, and a piston operating in said cylinder and provided with means adapted to project into said secondary chamber when the piston is at top dead center for displacing at least a portion of the fuel in said secondary chamber and transposing the same into said primary chamber.

11. In an internal combustion engine, a cylinder, a cylinder head provided with a combustion chamber consisting of a primary chamber and a secondary chamber surrounding the primary chamber and located adjacent the cylinder wall, means for introducing a combustible fuel into said cylinder and imparting a swirling motion thereto, and a piston operating in said cylinder and provided with means adapted to project into said secondary chamber when the piston is at top dead center for displacing at least a portion of the fuel in said secondary chamber and transposing the same into said primary chamber, and means acting on said transposed fuel to impart a directional force thereto counter to the direction of rotation of the swirl in the primary chamber.

12. In an internal combustion engine having a combustion chamber adapted for containing a swirling fuel mixture, a piston, a spark plug, and means responsive to outward movement of the piston for transposing portions of said fuel mixture whereby to increase the density of the fuel mixture in the region of the spark plug just prior to ignition.

13. In an internal combustion engine having a combustion chamber, a piston, a spark plug, means for introducing a fuel mixture into said combustion chamber and for providing a swirling movement of the fuel mixture in said combustion chamber, said swirl providing one combustion chamber zone in the region of the spark plug and one or more combustion chamber zones remote from the spark plug formed of a relatively more dense fuel mixture by reason of said swirl, and means for transposing at least a portion of the fuel mixture from one of the latter zones into the zone in the region of the spark plug.

14. An internal combustion engine having a combustion chamber, a piston, means for introducing a fuel mixture into said combustion chamber, means responsive to outward compressing movement of the piston for providing a swirling movement of the fuel mixture, a spark plug located in proximity to the center of the swirl, and fuel mixture means acting in response to said piston movement prior to ignition to counteract the tendency of the center of the swirl to become less dense.

15. In an internal combustion engine, a cylinder, a spark plug, a combustion chamber, a piston, means for introducing a combustible fuel into said cylinder and imparting a swirling motion thereto, means responsive to outward piston movement for transposing at least a portion of the fuel adjacent the periphery of the swirl into the center of the swirl, and means also responsive to said outward piston movement for imparting to said transposed fuel a directional force counter to the direction of rotation of said swirl, while at the same time substantially maintaining the swirling condition of the fuel mixture in the combustion chamber at parts remote from the spark plug.

16. The method of preparing a fuel mixture for an internal combustion engine including introducing a fuel mixture into the engine, imparting a swirling movement to the fuel mixture, and introducing an additional quantity of fuel into substantially the central zone of the swirl prior to igniting the fuel mixture for counteracting the tendency in the fuel mixture to become less dense at the central zone of the swirl.

17. The method of preparing a fuel mixture for an internal combustion engine having a combustion chamber and a spark plug consisting in introducing a fuel mixture into the combustion chamber and imparting a swirling motion thereto during compression thereof thereby providing a zone of fuel mixture having relatively less density in the region of the spark plug in comparison with the fuel mixture of a zone in a region remote from the spark plug, and transposing during said compression at least a portion of the fuel mixture from the zone remote from the spark plug into the zone in the region of the spark plug for increasing the density of the fuel mixture in the region of the said spark plug.

18. The method of preparing a fuel mixture for an internal combustion engine including introducing a fuel mixture into the engine, imparting a swirling movement to the fuel mixture, and introducing an additional quantity of fuel mixture into substantially the central zone of the swirl prior to igniting the fuel mixture for counteracting the tendency in the fuel mixture to become less dense at the central zone of the swirl.

19. The method of preparing a fuel mixture for an internal combustion engine consisting in introducing a fuel mixture into the engine combustion chamber and causing the fuel mixture in the chamber to swirl, substantially dividing the swirling fuel mixture into combustion chamber zones at the spark plug and remote from the spark plug respectively, and maintaining the fuel mixture swirl in the spark plug zone just prior to igniting the fuel mixture while at the same time introducing a portion of the fuel mixture from the remote zone to substantially the central portion of the spark plug zone.

20. An internal combustion engine of the sleeve valve type including a cylinder, sleeve valve means disposed within the cylinder and controlling inlet and exhaust ports in the cylinder wall, a piston operable within the cylinder, a cylinder head closing the cylinder and forming a combustion chamber together with said piston, means under control of said sleeve valve means for introducing a fuel mixture to said combustion chamber whereby said fuel mixture is caused to swirl about said combustion chamber, and means induced by movement of said piston for transposing a portion of the swirling fuel mixture from a portion of the combustion chamber remote from the center of the swirling fuel mixture to that portion of the combustion chamber containing the center of the swirling fuel mixture, and means for igniting the fuel mixture.

21. An internal combustion engine of the sleeve valve type including a cylinder, sleeve valve means disposed within the cylinder and controlling inlet and exhaust ports in the cylinder wall, a piston operable within the cylinder, a cylinder head closing the cylinder and forming a combustion chamber together with said piston, means under control of said sleeve valve means for introducing a fuel mixture to said combustion chamber whereby said fuel mixture is caused to swirl about said combustion chamber, and means induced by movement of said piston for transposing a portion of the swirling fuel mixture from a portion of the combustion chamber remote from the center of the swirling fuel mixture to that portion of the combustion chamber containing the center of the swirling fuel mixture, and means for igniting the fuel mixture substantially at said center of the swirling fuel mixture.

22. An internal combustion engine of the sleeve valve type including a cylinder, sleeve valve means disposed within the cylinder and controlling inlet and exhaust ports in the cylinder wall, a piston operable within the cylinder, a cylinder head closing the cylinder and forming a combustion chamber together with said piston, means under control of said sleeve valve means for introducing a fuel mixture to said combustion chamber whereby said fuel mixture is caused to swirl about said combustion chamber, and means induced by movement of said piston for transposing a portion of the swirling fuel mixture from a portion of the combustion chamber remote from the center of the swirling fuel mixture to that portion of the combustion chamber containing the center of the swirling fuel mixture, and means for igniting the fuel mixture after said transposition of a portion of the swirling fuel mixture.

23. An internal combustion engine of the sleeve valve type including a cylinder, sleeve valve means disposed within the cylinder and controlling inlet and exhaust ports in the cylinder wall, a piston operable within the cylinder, a cylinder head closing the cylinder and forming a combustion chamber together with said piston, means under control of said sleeve valve means for introducing a fuel mixture to said combustion chamber whereby said fuel mixture is caused to swirl about said combustion chamber, said combustion chamber having a primary portion and a secondary portion substantially remote from said primary portion but communicating therewith in the outermost position of piston travel, and means induced by movement of said piston for transposing a portion of the fuel mixture in said secondary portion of the combustion chamber to the primary portion thereof whereby to increase the density of the central zone of the swirling fuel mixture in the primary portion.

24. An internal combustion engine of the sleeve valve type having in combination a cylinder, sleeve valve means within the cylinder and controlling inlet and exhaust ports in the cylinder wall, a cylinder head closing the outer end of the cylinder, a piston operable within said sleeve valve, said cylinder head, piston, and sleeve valve means co-operating to provide a combustion chamber having primary and secondary portions, means for introducing a fuel mixture to said combustion chamber portions, said piston in its outermost travel displacing a portion of the fuel mixture from one of said combustion chamber portions to the other.

25. An internal combustion engine of the sleeve valve type having in combination a cylinder, sleeve valve means within the cylinder and controlling inlet and exhaust ports in the cylinder wall, a cylinder head closing the outer end of the cylinder, a piston operable within said sleeve valve, said cylinder head, piston, and sleeve valve means co-operating to provide a combustion chamber having primary and secondary portions, means for introducing a fuel mixture to said combustion chamber portions, said piston in its outermost travel displacing a portion of the fuel mixture from said secondary portion to said primary portion.

26. An internal combustion engine of the sleeve valve type having in combination a cylinder, sleeve valve means within the cylinder and controlling inlet and exhaust ports in the cylinder wall, a cylinder head closing the outer end of the cylinder, a piston operable within said sleeve valve, said cylinder head, piston, and sleeve valve means co-operating to provide a combustion chamber having primary and secondary portions, means for introducing a fuel mixture to said combustion chamber portions, said piston in its outermost travel displacing a portion of the fuel mixture from one of said combustion chamber portions to the other, said secondary combustion chamber portion extending substantially concentrically around said primary combustion chamber portion.

27. In an engine of the sleeve valve type, a cylinder, sleeve valve means within the cylinder controlling introduction of fuel mixture to the cylinder, a cylinder head structure closing the outer end of the cylinder, a piston structure operable within said cylinder, said structures cooperating to provide an inner primary combustion chamber and an outer secondary combustion chamber, one of said structures having a portion adapted during the outermost travel of said piston structure to extend into said secondary combustion chamber whereby to displace a portion of the fuel mixture from said secondary chamber to said primary chamber.

28. The method of preparing a fuel mixture for an internal combustion engine including introducing a fuel mixture into the combustion chamber of the engine and imparting a swirling movement to the fuel mixture, compressing the fuel mixture while swirling in the same direction, and transposing a portion of the fuel mixture from one part of the combustion chamber to another part substantially at the outermost position of the engine piston during compression in a manner to oppose the swirling of the fuel mixture.

29. The method of preparing a fuel mixture for combustion in an internal combustion engine of the sleeve valve type consisting in compressing the fuel mixture by piston movement so as to cause the fuel mixture to swirl in the combustion chamber and thereby form zones of relatively varying density, and transposing a portion of the fuel mixture of relatively great density to the zone of relatively less density substantially at the end of the compression and prior to igniting the fuel mixture.

In testimony whereof I affix my signature.

ANDRE J. MEYER.